United States Patent
Lee et al.

(10) Patent No.: US 9,998,716 B2
(45) Date of Patent: Jun. 12, 2018

(54) IMAGE SENSING DEVICE AND IMAGE PROCESSING SYSTEM USING HETEROGENEOUS IMAGE SENSOR

(71) Applicant: Samsung Electronics Co., Ltd., Suwon-si, Gyeonggi-do (KR)

(72) Inventors: Jong-Hwa Lee, Gwangmyeong-si (KR); Jin-Aeon Lee, Suwon-si (KR); Woong-Hee Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days. days.

(21) Appl. No.: 15/220,824

(22) Filed: Jul. 27, 2016

(65) Prior Publication Data
US 2017/0064263 A1    Mar. 2, 2017

(30) Foreign Application Priority Data
Aug. 24, 2015  (KR) ........................ 10-2015-0118700

(51) Int. Cl.
*H04N 5/225* (2006.01)
*H04N 5/232* (2006.01)
*H04N 9/04* (2006.01)
*H04N 9/09* (2006.01)

(52) U.S. Cl.
CPC ........... *H04N 9/045* (2013.01); *H04N 5/2258* (2013.01); *H04N 5/23232* (2013.01); *H04N 9/09* (2013.01); *H04N 2209/045* (2013.01)

(58) Field of Classification Search
CPC ...... H04N 9/045; H04N 9/09; H04N 5/23232; H04N 5/2258; H04N 2209/045

USPC ......................................... 348/238, 262–264
See application file for complete search history.

(56) References Cited

U.S. PATENT DOCUMENTS

| | | | | |
|---|---|---|---|---|
| 4,149,182 | A * | 4/1979 | Yamanaka | H04N 9/045 348/238 |
| 6,614,471 | B1 * | 9/2003 | Ott | H04N 1/486 348/234 |
| 7,492,390 | B2 * | 2/2009 | Kaplinsky | H04N 5/23203 348/211.3 |
| 8,098,288 | B2 * | 1/2012 | Takeshita | H04N 5/145 348/208.6 |
| 8,154,610 | B2 | 4/2012 | Jo et al. | |
| 8,890,942 | B2 | 11/2014 | Ogasahara et al. | |

(Continued)

FOREIGN PATENT DOCUMENTS

JP    2010-141140 A    6/2010
KR   2014-0106221 A    9/2014

*Primary Examiner* — Albert Cutler
(74) *Attorney, Agent, or Firm* — Harness, Dickey & Pierce, P.L.C.

(57) ABSTRACT

An image sensing device includes a single-color image sensor and a multi-color image sensor having resolutions different from each other; image data receiving circuitry configured to receive first image data from the single-color image sensor and second image data from the multi-color image sensor; first preprocessor circuitry configured to generate first aligned image data and second aligned image data based on the first image data and the second image data, respectively, by correcting an optical path difference between a pixel stream of the first image data and a pixel stream of the second image; and second preprocessor circuitry configured to generate third image data by merging the first aligned image data and the second aligned image data.

16 Claims, 17 Drawing Sheets

(56) References Cited

U.S. PATENT DOCUMENTS

| | | | | |
|---|---|---|---|---|
| 2003/0048493 | A1* | 3/2003 | Pontifex | H04N 5/243 358/514 |
| 2006/0125936 | A1* | 6/2006 | Gruhike | H04N 9/045 348/238 |
| 2010/0073499 | A1* | 3/2010 | Gere | H04N 5/2254 348/222.1 |
| 2011/0298951 | A1* | 12/2011 | Yoshikawa | H04N 5/2258 348/234 |
| 2013/0016251 | A1* | 1/2013 | Ogasahara | H04N 5/2258 348/238 |
| 2014/0118582 | A1 | 5/2014 | Artyomov et al. | |
| 2015/0042831 | A1 | 2/2015 | Linaker et al. | |
| 2015/0103200 | A1 | 4/2015 | Vondran, Jr. et al. | |
| 2017/0094141 | A1* | 3/2017 | Hicks | H04N 5/2258 |

* cited by examiner

FIG. 3

| G | R | G | R |
|---|---|---|---|
| B | G | B | G |
| G | R | G | R |
| B | G | B | G |

200

N Bits/Pixel

| G | G+R | G | G+R |
|---|---|---|---|
| G+B | G | G+B | G |
| G | G+R | G | G+R |
| G+B | G | G+B | G |

210

1.5N Bits/Pixel

| RGB | RGB | RGB | RGB |
|---|---|---|---|
| RGB | RGB | RGB | RGB |
| RGB | RGB | RGB | RGB |
| RGB | RGB | RGB | RGB |

220

3N Bits/Pixel

1200

1300

1400

IMAGE SENSING DEVICE AND IMAGE PROCESSING SYSTEM USING HETEROGENEOUS IMAGE SENSOR

CROSS-REFERENCE TO RELATED APPLICATION

This application claims priority under 35 U.S.C. § 119 to Korean Patent Application No. 10-2015-0118700 filed on Aug. 24, 2015 in the Korean Intellectual Property Office, the disclosure of which is incorporated herein by reference in its entirety.

BACKGROUND

1. Technical Field

At least some example embodiments of the inventive concepts relate to an image sensing device and an image processing system.

2. Description of the Related Art

An image sensor may generate image data of a scene or an object photographed through a lens, and an image signal processor (ISP) may process the image data to display images on a display device. Recently, a dual image sensor has been used to acquire, for example, a depth map including information on a distance from a viewpoint to a surface of an object or to acquire a high resolution image in an inexpensive manner. The dual image sensor may include a heterogeneous image sensor having different characteristics depending on the intended use thereof.

SUMMARY

At least one example embodiment of the inventive concepts provides an image sensing device in which compatibility between image data acquired using a heterogeneous image sensor and an image signal processor is ensured.

At least another example embodiment of the inventive concepts provides an image processing system in which compatibility between image data acquired using a heterogeneous image sensor and an image signal processor is ensured.

However, at least some example embodiments of the inventive concepts are not restricted to the examples set forth herein.

According to at least some example embodiments of the inventive concepts, an image sensing device includes a single-color image sensor and a multi-color image sensor having resolutions different from each other; image data receiving circuitry configured to receive first image data from the single-color image sensor and second image data from the multi-color image sensor; first preprocessor circuitry configured to generate first aligned image data and second aligned image data based on the first image data and the second image data, respectively, by correcting an optical path difference between a pixel stream of the first image data and a pixel stream of the second image; and second preprocessor circuitry configured to generate third image data by merging the first aligned image data and the second aligned image data.

The single-color image sensor may be configured to sense green light.

The multi-color image sensor may be configured to sense red light and blue light.

The multi-color image sensor may be configured to sense red light, green light and blue light, and output the second image data in Bayer format.

The second preprocessor circuitry is configured to generate the third image data in Bayer format or Bayer+ format.

The single-color image sensor and the multi-color image sensor may be located in the image sensing device such that the single-color image sensor and the multi-color image sensor are located on a same plane.

The image sensing device may further include a first lens and a second lens, wherein the single-color image sensor is configured to sense light through the first lens and the multi-color image sensor is configured to sense light through the second lens.

The first preprocessor circuitry may be configured to align the pixel stream of the first image data and the pixel stream of the second image data in a virtual single plane so as to correct the optical path difference between the pixel streams of the first and second image data.

The second preprocessor circuitry may be configured to generate the third image data based on a resolution of the first image data.

According to at least some example embodiments of the inventive concepts, an image processing system includes a single-color image sensor and a multi-color image sensor having resolutions different from each other, the single-color image sensor and the multi-color image sensor being configured to generate a first pixel stream and a second pixel stream, respectively; preprocessing circuitry configured to, generate a first aligned pixel stream and a second aligned pixel stream based on a first pixel stream and a second pixel stream, respectively, by correcting an optical path difference between the first pixel stream and the second pixel stream, and generate a third pixel stream by merging the first aligned pixel stream and the second aligned pixel stream; and an image signal processor (ISP) configured to receive the third pixel stream, generate an image from the third pixel stream, and display the generated image on a display.

The preprocessing circuitry may include a first preprocessor circuit configured to generate the first aligned pixel stream and the second aligned pixel stream by correcting the optical path difference between the first pixel stream and the second pixel stream and correcting an intensity difference between the first pixel stream and the second pixel stream after correcting the optical path difference.

The preprocessing circuitry may include a second preprocessor circuit configured to generate the third pixel stream by merging the first aligned pixel stream and the second aligned pixel stream after the first preprocessor circuit corrects the optical path difference and the intensity difference between the first pixel stream and the second pixel stream.

The preprocessing circuitry may include a first preprocessor circuit configured to generate the first aligned pixel stream and the second aligned pixel stream by correcting the optical path difference between the first pixel stream and the second pixel stream, and the preprocessing may include a second preprocessor circuit configured to correct an intensity difference between the first pixel stream and the second pixel stream prior to merging the first pixel stream and the second pixel stream.

The second preprocessor circuit may be configured to calculate intensity difference information from the first pixel stream and the second pixel stream with respect to a previous scene, and correct the intensity difference between the first pixel stream and the second pixel stream with respect to a current scene by using the intensity difference information.

The first preprocessor circuit may be configured to store the first pixel stream and the second pixel stream for the previous scene in a buffer, and the second preprocessor circuit is configured to read the buffer so as to acquire the first pixel stream and the second pixel stream for the previous scene.

According to at least some example embodiments of the inventive concepts, n image sensing device includes a single-color image sensor and a multi-color image sensor having resolutions different from each other; a memory storing computer-executable instructions; and one or more processors configured to execute the computer-executable instructions such that the one or more processors are configured to, generate first aligned image data and second aligned image data based on first image data and second image data, respectively, by correcting an optical path difference between a pixel stream of the first image data and a pixel stream of the second image data, and generate third image data by merging the first aligned image data and the second aligned image data, the first image data being image data generated based on light incident on the single-color image sensor, the second image data being image data generated based on light incident on the multi-color image sensor.

The single-color image sensor may be configured to sense green light.

The multi-color image sensor may be configured to sense red light and blue light.

The image sensing device of claim 16 may further include a first lens and a second lens, wherein the single-color image sensor is configured to sense light through the first lens and the multi-color image sensor is configured to sense light through the second lens.

The image sensing device may further include a first lens, wherein the single-color image sensor is configured to sense light through the first lens and the multi-color image sensor is configured to sense light through the first lens.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 3 is a conceptual diagram illustrating an image data format used in at least some example embodiments of the inventive concepts;

DETAILED DESCRIPTION OF THE EMBODIMENTS

Figure 1A:
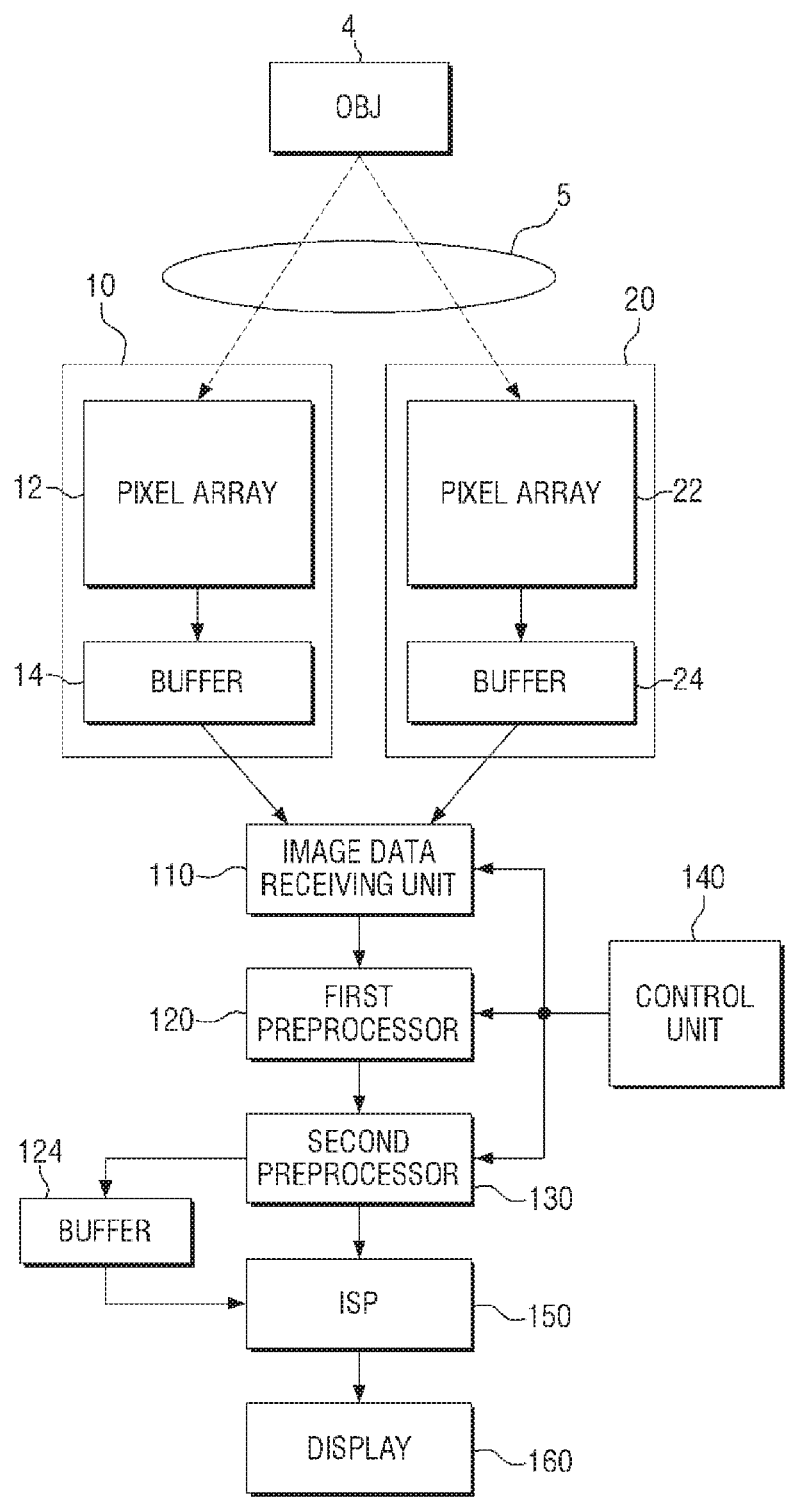
FIG. 1A schematically illustrates an image processing system according at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein, be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein, provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures memory cell structures or transistor structures), as would be illustrated by a plan view of the electronic device. The plurality of device structures may be arranged in an array and/or in a two-dimensional pattern.

Figure 1B:
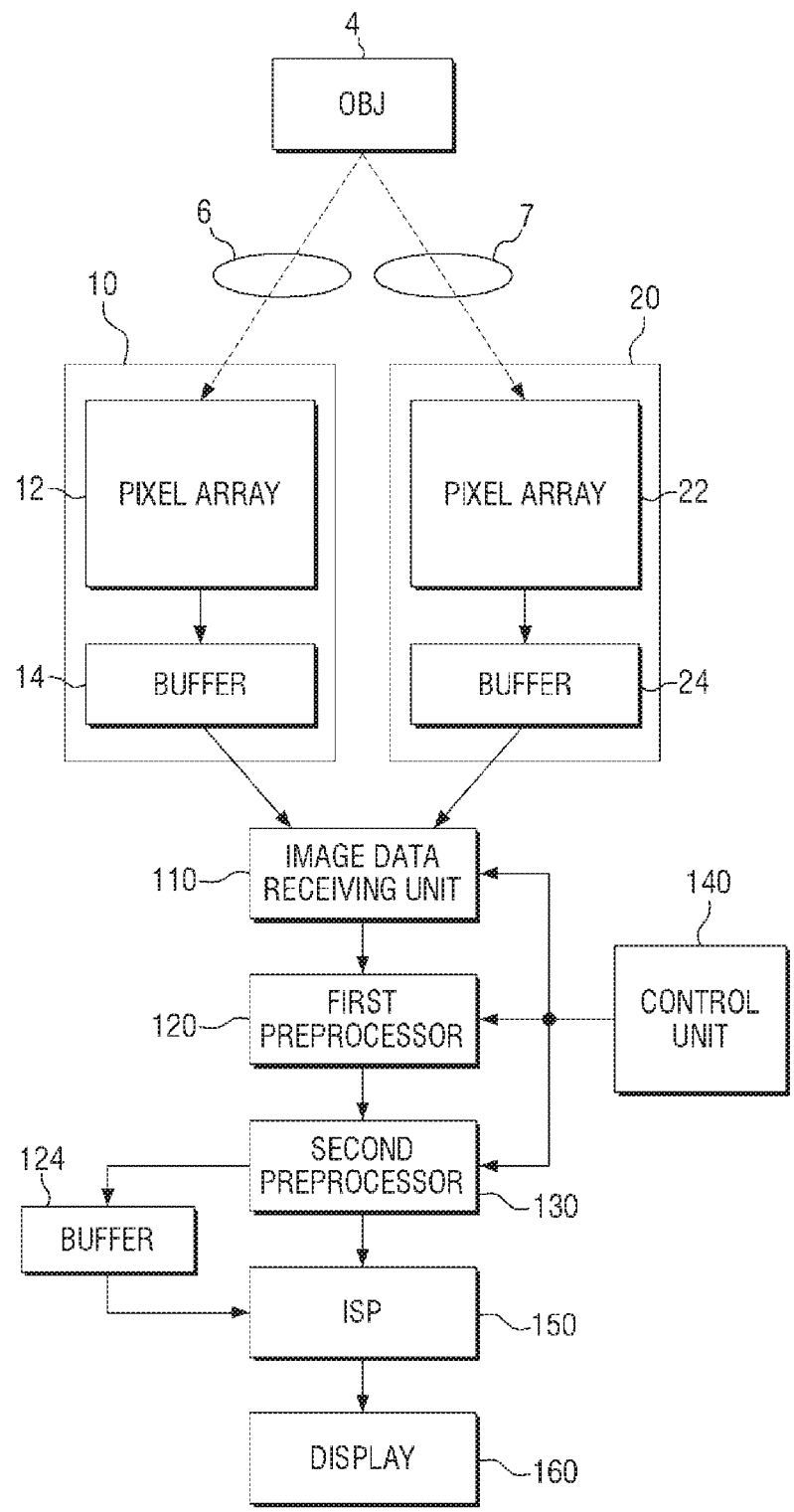
FIG. 1B schematically illustrates an image processing system according to at least another example embodiment of the inventive concepts.

FIG. 1A schematically illustrates an image processing system according to at least one example embodiment of the inventive concepts, and FIG. 1B schematically illustrates an image processing system according to at least another example embodiment of the inventive concepts.

Referring to FIG. 1A, an image processing system according to at least one example embodiment of the inventive concepts may include a first image sensor 10, a second image sensor 20, an image data receiving unit 110, a first preprocessor unit 120, a second preprocessor unit 130, a control unit 140 and an image signal processor (ISP) 150.

The first image sensor 10 and the second image sensor 20 may sense an object 4 (or a scene) photographed through a lens 5. The first image sensor 10 may include a pixel array 12 for sensing light through the lens 5, and a buffer 14 for temporarily storing image data acquired through the pixel array 12 before transmitting the image data to the image data receiving unit 110. The second image sensor 20 may also include a pixel array 22 for sensing light through the lens 5, and a buffer 24 for temporarily storing image data acquired through the pixel array 22 before transmitting the image data to the image data receiving unit 110.

The first image sensor 10 and the second image sensor 20 may simultaneously sense light through the lens 5. That is, the first image sensor 10 and the second image sensor 20 may be disposed respectively at difference locations toward the lens 5 such that the first image sensor 10 and the second image sensor 20 may sense, at the different locations, light incident through the lens 5. Thus, the first image sensor 10 and the second image sensor 20 may simultaneously sense the same object 4. However, since a path of the light incident to the first image sensor 10 and a path of the light incident to the second image sensor 20 may vary depending on the relative location of the first image sensor 10, the second image sensor 20 and the lens 5, the image data acquired by the first image sensor 10 and the image data acquired by the second image sensor 20 may not be spatially aligned with each other. According to at least some example embodiments of the inventive concepts, the first image sensor 10 and the second image sensor 20 may be arranged in the same plane facing the lens 5, but the present disclosure is not limited thereto.

Referring to FIG. 1B, according to at least some example embodiments of the inventive concepts, the image processing system using the first image sensor 10 and the second image sensor 20 may photograph the object 4 using a plurality of lenses 6 and 7. Specifically, the first image sensor 10 may sense light through the lens 6, and the second image sensor 20 may sense light through the lens 7. According to at least some example embodiments of the inventive concepts, the first image sensor 10 and the second image sensor 20 may sense light through the respective lenses 6 and 7 at the same time, or sense at different times with a time difference between them. The lenses 6 and 7 may be of different types having different optical properties, or the same type having the same optical properties. According to at least some example embodiments of the inventive concepts, with the exception of the features described above regarding the image processing system of FIG. 1B including two lenses (i.e., lenses 6 and 7), the image processing system of FIG. 1B may have the same structure and operation as those described in the present disclosure with respect to the image processing system of FIG. 1A.

Referring back to FIG. 1A, the first image sensor 10 and the second image sensor 20 may have different resolution, and specifically, the resolution of the first image sensor 10 may be higher than the resolution of the second image sensor 20. For example, the resolution of the first image sensor 10 may be 16M pixel and the resolution of the second image sensor 20 may be 4M pixel. Furthermore, the first image sensor 10 may be a single-color image sensor and the second image sensor 20 may be a multi-color image sensor. For example, the first image sensor 10 may be a single-color image sensor that senses only green light, and the second image sensor 20 may be a multi-color image sensor that senses only red light and blue light or red light, green light and blue light. Furthermore, the second image sensor 20 may sense, for example, red light, green light and blue light and output Bayer format image data which will be described later with reference to FIG. 3. As described above, in at least some example embodiments of the inventive concepts, the first image sensor 10 and the second image sensor 20 may be heterogeneous image sensors.

According to at least some example embodiments of the inventive concepts, the first image sensor 10 may be a charge coupled device (CCD) image sensor, a complementary metal-oxide-semiconductor (CMOS) image sensor or the like, but the present disclosure is not limited thereto. According to at least some example embodiments of the inventive concepts, the second image sensor 20 may be a charge coupled device (CCD) image sensor, a complementary metal-oxide-semiconductor (CMOS) image sensor or the like, but the present disclosure is not limited thereto.

The image data receiving unit 110 may receive first image data and second image data respectively from the first image sensor 10 and the second image sensor 20. For example, the first image data received from the first image sensor 10 may include single color image data (for example, green image data), and the second image data received from the second image sensor 20 may include multi-color image data (for example, red and blue image data or red, green and blue image data). Each of the first image data and the second image data may include a pixel stream formed of a plurality of pixels.

The first preprocessor unit 120 may correct an optical path difference between the first image data and the second image data received from the image data receiving unit 110. As described above, since a path of the light incident to the first image sensor 10 and a path of the light incident to the second image sensor 20 may vary depending on the relative location of the first image sensor 10, the second image sensor 20 and the lens 5, the first image data and the second image data may not be spatially aligned with each other. Thus, the first preprocessor unit 120 may correct (that is, spatially align) an optical path difference between the pixel stream of the first image data and the pixel stream of the second image data, and provide the pixel stream of the first image data and the pixel stream of the second image data that have undergone the optical path difference correction to the second preprocessor unit 130. Meanwhile, the first preprocessor unit 120 may use the buffer 124 as a temporary storage space as needed, and descriptions relating to the buffer 124 will be made later with reference to FIG. 12.

The second preprocessor unit 130 may merge the pixel stream of the first image data and the pixel stream of the second image data that have undergone the optical path difference correction so as to generate third image data. The method of merging the pixel stream of the first image data and the pixel stream of the second image data will be described later with reference to FIG. 4 to FIG. 10. According to at least some example embodiments of the inventive concepts, the third image data may be formed into Bayer format or Bayer+ format which will be described later with reference to FIG. 3.

The control unit 140 may control the image data receiving unit 110, the first preprocessor unit 120 and the second preprocessor unit 130 described above. According to at least some example embodiments of the inventive concepts, the control unit 140 may be a processor that drives firmware so as to control the image data receiving unit 110, the first preprocessor unit 120 and the second preprocessor unit 130. Any or all of the image data receiving unit 110, the first preprocessor unit 120 and the second preprocessor unit 130 described above (and/or elements thereof) may be realized in, for example, an electronic circuit such as a field programmable gate array (FPGA) and application specific integrated circuit (ASIC). Accordingly, the image data receiving unit 110, first preprocessor unit 120, and second preprocessor unit 130 may be implemented as image data receiving circuitry, first preprocessor circuitry, and second preprocessor circuitry, respectively. Further, according to at least some example embodiments, the first preprocessor unit 120 and second preprocessor unit 130 may be referred to collectively as preprocessing circuitry. Further, according to at least some example embodiments of the inventive concepts, any or all of the image data receiving unit 110, the first preprocessor unit 120 and the second preprocessor unit 130 (and/or elements thereof) may be embodied by a certain processor (e.g., the control unit 140 or, alternatively, a processor that is included in the image processing system of FIG. 1A or FIG. 1B and is not illustrated) executing software or a program code. According to at least some example embodiments of the inventive concepts, the control unit 140 may be or include the certain processor. Additionally, according to at least some example embodiments of the inventive concepts, the image data receiving unit 110, the first preprocessor unit 120 and the second preprocessor unit 130 (and/or elements thereof) may be embodied by combination of the above-referenced electronic circuits and software executed by the certain processor. According to at least some example embodiments of the inventive concepts, any or all of the ISP 150, the control unit 140, and the above-referenced certain processor may be a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, amulet-core processor; a multiprocessor, an application-specific integrated circuit (ASIC), and a field programmable gate array (FPGA). Processors executing program code are programmed processors, and thus, are special-purpose computers.

The ISP 150 may receive the third image data (or pixel stream of the third image data) from the second preprocessor unit 130, and generate an image from the received third image data and display the image on a display device 160. According to at least some example embodiments of the inventive concepts, the display device 160 may be any structure capable of presenting information in such a manner that the information is visible to a user (e.g., liquid crystal displays (LCDs) and/or light-emitting diode (LED)-implemented displays). Examples of the display device 160 include, but are not limited to, a mobile phone display, a laptop display, a tablet display, and a display of a wearable electronic device (e.g., a smartwatch). According to at least some example embodiments of the inventive concepts, the ISP 150 may receive, from the second preprocessor unit 130 through a single channel, the pixel stream of the third image data sensed by the first image sensor 10 and the second image sensor 20, which are heterogeneous image sensors, and merged by the second preprocessor unit 130. Furthermore, the ISP 150 may generate depth map information on the object 4 from the pixel stream of the third image data sensed by the first image sensor 10 and the second image sensor 20 and merged by the second preprocessor unit 130.

It be hereinafter assumed that the first image sensor 10 is a green image sensor and the second image sensor 20 is a multi-color image sensor, but the present disclosure is not limited thereto.

Figure 2:
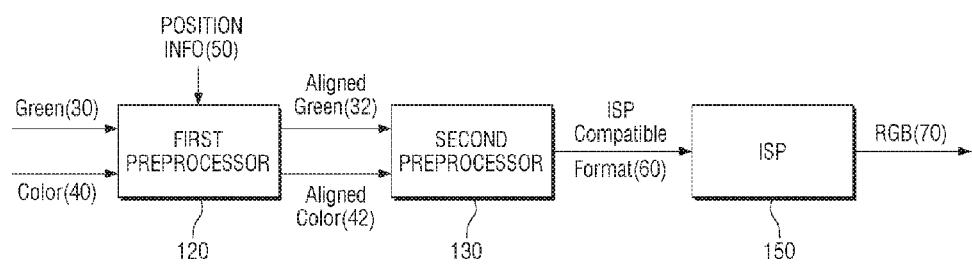
FIG. 2 schematically illustrates an image sensing device according to at least one example embodiment of the inventive concepts.

FIG. 2 schematically illustrates an image sensing device according to at least one example embodiment of the inventive concepts.

Referring to FIG. 2, the image sensing device according to at least one example embodiment of the inventive concepts may include the first preprocessor unit 120 and the second preprocessor unit 130 described above. According to at least some example embodiments, the image sensing device illustrated in FIG. 2 represents a portion of the image processing system of FIG. 1A and/or a portion of the image processing system of FIG. 1B.

The first preprocessor unit 120 may receive green image data 30 acquired by the first image sensor 10 and multi-color image data 40 acquired by the second image sensor 20. As described above, since the green image data 30 and the multi-color image data 40 are not spatially aligned due to an optical path difference, the first preprocessor unit 120 may spatially align the green image data 30 and the multi-color image data 40 so as to enable the second preprocessor unit 130 to perform later a merge operation for merging image data.

According to at least some example embodiments of the inventive concepts, the green image data 30 and the multi-color image data 40 may be photographed by using the single lens 5, or the green image data 30 may be photographed by using the lens 6 and the multi-color image data 40 may be photographed by using the lens 7.

According to at least some example embodiments of the inventive concepts, the first preprocessor unit 120 may receive relative location information 50 on the first image sensor 10, the second image sensor 20 and the lens 5 from the control unit 140 for example. According to at least some example embodiments of the inventive concepts, the location information 50 may be determined during the process of manufacturing an image sensing device (e.g., the image processing system of FIG. 1A or the image processing system of FIG. 1B) or during driving of the image sensing device. The first preprocessor unit 120 may spatially align the green image data 30 and the multi-color image data 40 using the location information 50, thereby correcting an optical path difference. Meanwhile, According to at least some example embodiments of the inventive concepts, the first preprocessor unit 120 may align the pixel stream of the green image data 30 and the pixel stream of the multi-color image data 40 in a virtual single plane, thereby correcting an optical path difference between the pixel streams.

The second preprocessor unit 130 may receive, from the first preprocessor unit 120, the optical path difference corrected green image data 32 and the optical path difference corrected multi-color image data 42, and convert the received data into image data of a single ISP compatible format 60. Optical path difference corrected image data is also referred to herein as spatially aligned image data. According to at least some example embodiments of the inventive concepts, the ISP compatible format 60 may include Bayer format or Bayer+ format which will be described later with reference to FIG. 3, but the present disclosure is not limited there to.

Meanwhile, the second preprocessor unit 130 may perform an operation between the pixel stream of the spatially aligned image data green image data 32 and the pixel stream of the spatially aligned multi-color image data 42 on the basis of the resolution of the green image data 30 so as to generate image data of the ISP compatible format 60. Thus, the resolution of the ISP compatible format 60 may be determined by the resolution of the green image data 30, and the pixel color of the ISP compatible format 60 may be determined by the pixel color of the multi-color image data 40.

The ISP 150 may receive, from the second preprocessor unit 130, image data of the ISP compatible format 60 processable by the ISP 150, and generate, for example, RGB image data, from the received image data and display the generated image data, for example, on the display device 160.

FIG. 3 is a conceptual diagram illustrating an image data format used in at least some example embodiments of the inventive concepts.

Referring to FIG. 3, a pixel pattern 200 of Bayer format may include a plurality f pixels, and each pixel may represent one of red R, green G and blue B colors. In this case, the number of bits per pixel is N. Meanwhile, a green pixel G is added to a red pixel R and a blue pixel B in a pixel pattern 210 of Bayer+ format, thereby making the number of bits per pixel 1.5N. Each pixel in a pixel pattern 220 of an RGB format represents all of red R, green G and blue B colors, thereby making the number of bits per pixel 3N.

The Bayer format and Bayer+ format as used in at least some example embodiments of the inventive concepts may have advantages in that the calculation complexity may be lowered since the number of bits per pixel is less than that of the RGB format as described above. Furthermore, the Bayer+ format may have advantages of superior image quality in that the Bayer+ format has richer information than Bayer format.

An operation of the image sensing device according to at least some example embodiments of the inventive concepts will now be described on the basis of an understanding of the pixel pattern 200 of Bayer format, the pixel pattern 210 of Bayer+ format and the pixel pattern 220 of RGB format.

Figure 4:
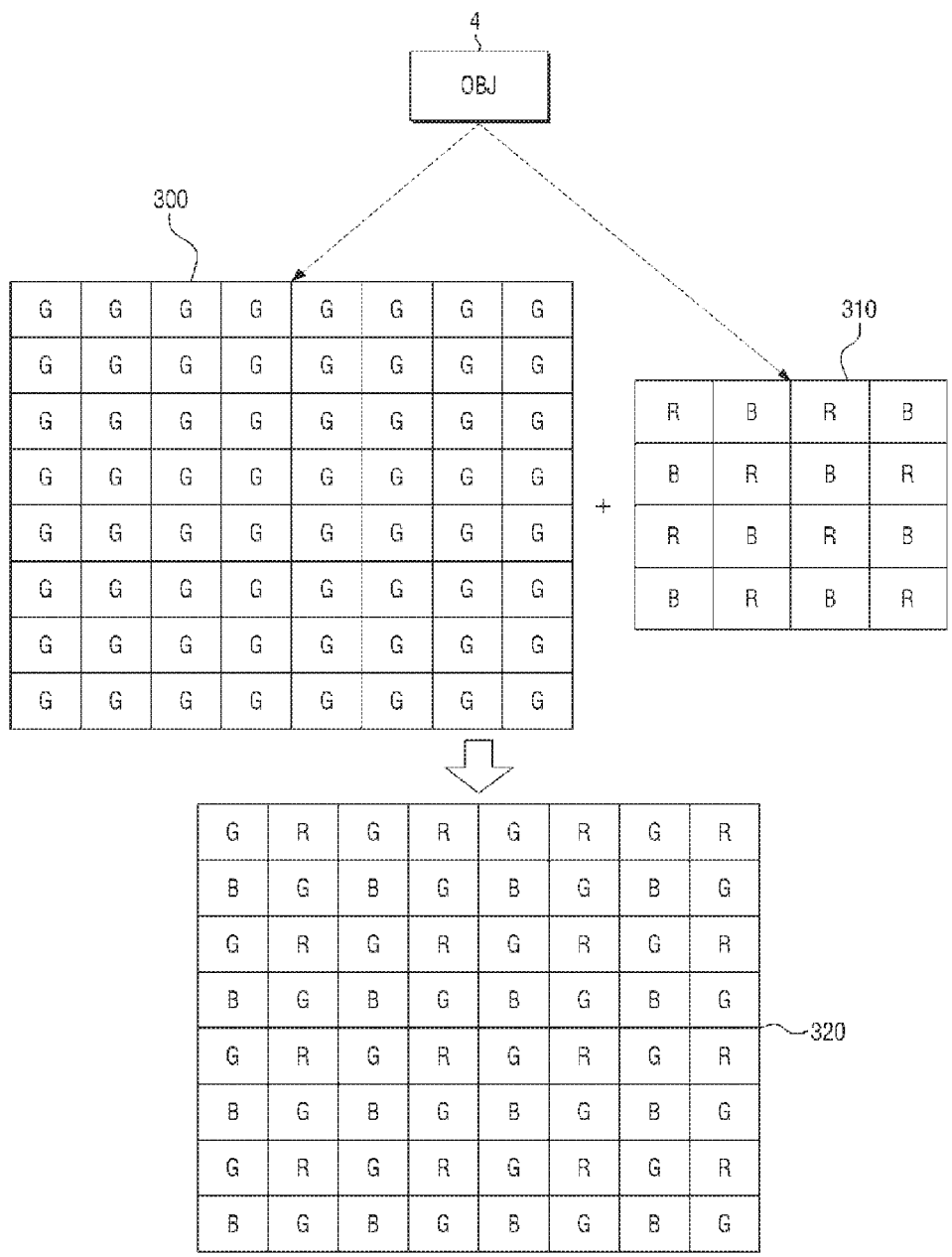
FIG. 4 schematically illustrates an operation of the image sensing device according to at least one example embodiment of the inventive concepts.
Figure 5:
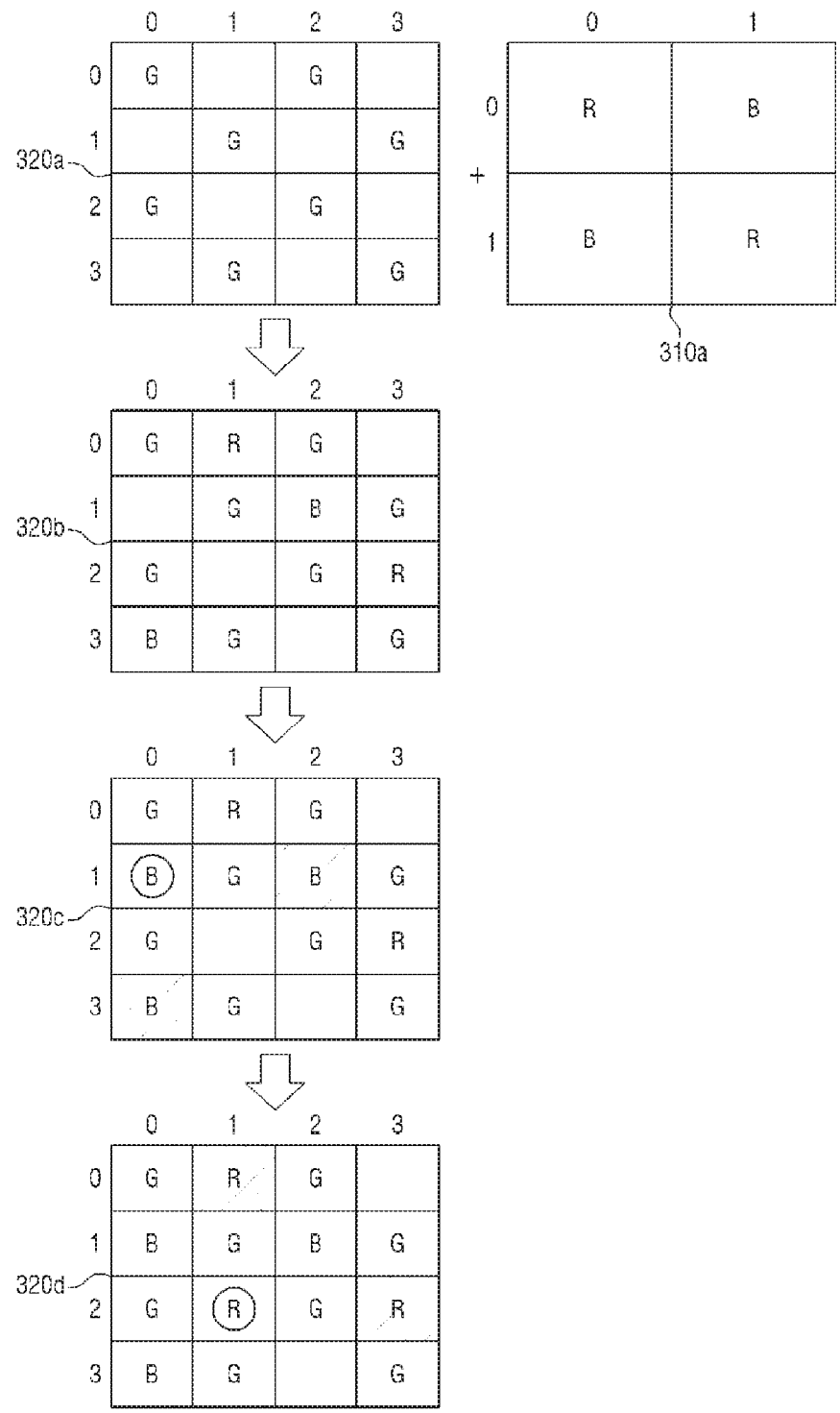
FIG. 5 schematically illustrates an example operation of the image sensing device according to at least one example embodiment of the inventive concepts.

FIG. 4 schematically illustrates an operation of the image sensing device according to at least one example embodiment of the inventive concepts, and FIG. 5 schematically illustrates an example operation of the image sensing device according to at least one example embodiment of the inventive concepts.

Referring to FIG. 4, the object 4 sensed through the lens 5 or the lenses 6 and 7 may be sensed as first image data 300 which is green image data through the first image sensor 10, and as second image data 310 which is multi-color image data through the second image sensor 20. In the example shown in FIG. 4, the resolution of the first image data 300 may be four times higher than the resolution of the second image data 310. Meanwhile, it is assumed that the first image data 300 and the second image data 310 shown in FIG. 4 are spatially aligned by the first preprocessor unit 120.

Referring to FIG. 4, pixels of the second image data 310 represent either a red color or a blue color while all pixels of the first age data 300 represent a green color. Further, red pixels and blue pixels are arranged adjacent to each other in the second image data 310. The second preprocessor unit 130 may merge the pixel stream of the first image data 300 and the pixel stream of the second image data 310 so as to generate third image data 320 of Bayer format.

FIG. 5 illustrates an example process in which the second preprocessor unit 130 merges the pixel stream of the first image data 320a and the pixel stream of the second image data 310a so as to generate third image data 320b of Bayer format. In the example illustrated in FIG. 5, the resolution of the third image data 320b may be determined according to the first image data 320a, and it is assumed that the resolution of the second image data 310a is lower than the resolution of the third image data 320b. For example, the resolution of the second image data 310a is half of the resolution of the third image data 320b, so that one pixel of the second image data 310a (for example, the pixel in the location (0, 0) in the second image data 310a) overlaps with four pixels of the first image data 320a (for example, the pixels in the location (0, 0), (0, 1), (1, 0), and (1, 1) in the first image data 320a). In this case, green pixels of the third image data 320b of which resolution is in accordance with the resolution of the first image data 320a may be determined directly from the corresponding pixels of the first image data 320a.

The colors of the pixels in the location (0, 1) and (2, 3) in the third image data 320b may be determined as the colors of the pixels of the second image data 310a which are overlapped with the third image data 320b. Specifically, the color of the pixel in the location (0, 1) in the third image data. 320b may be determined as the color (R) of the pixel in the location (0, 0) in the second image data 310a, and the color of the pixel in the location (2, 3) in the third image data 320b may be determined as the color (R) of the pixel in the location (1, 1) in the second image data 310a. Similarly, the colors of the pixels in the location (1, 2) and (3, 0) in the third image data 320b may be determined as the colors of the pixels of the second image data 301a which are overlapped with the third image data 320b. Specifically, the color of the pixel in the location (1, 2) in the third image data 320b may be determined as the color (B) of the pixel in the location (0, 1) in the second image data 310a, and the color of the pixel in the location (3, 0) in the third image data 320b may be determined as the color (B) of the pixel n the location (1, 0) in the second image data 310a.

However, since colors of the pixels in the locations (0, 3), (1, 0), (2, 1) and (3, 2) in the third image data 320b may not be determined only by an overlap with the second image data 310a, the colors of the pixels may be determined from the colors of the nearby pixels. For example, the color of the pixel in the location (1, 0) in the third image data 320c may be determined by performing a predetermined or, alternatively, desired operation, for example, an interpolation operation, on the values of the colors of the pixels in the locations (1, 2) and (3, 0) determined by an overlap with the second image data 310a. Similarly, the color of the pixel in the location (2, 1) in the third image data 320d may be determined by performing a predetermined or, alternatively, desired operation, for example, an interpolation operation, on the values of the colors of the pixels in the locations (0, 1) and (2, 3) determined by an overlap with the second image data 310a.

The third image data 320 generated through the above-described process may adopt Bayer format which can be processed by the ISP 150, thus ensuring compatibility between the image data acquired using the heterogeneous image sensors 10 and 20 and the ISP 150.

Figure 6:
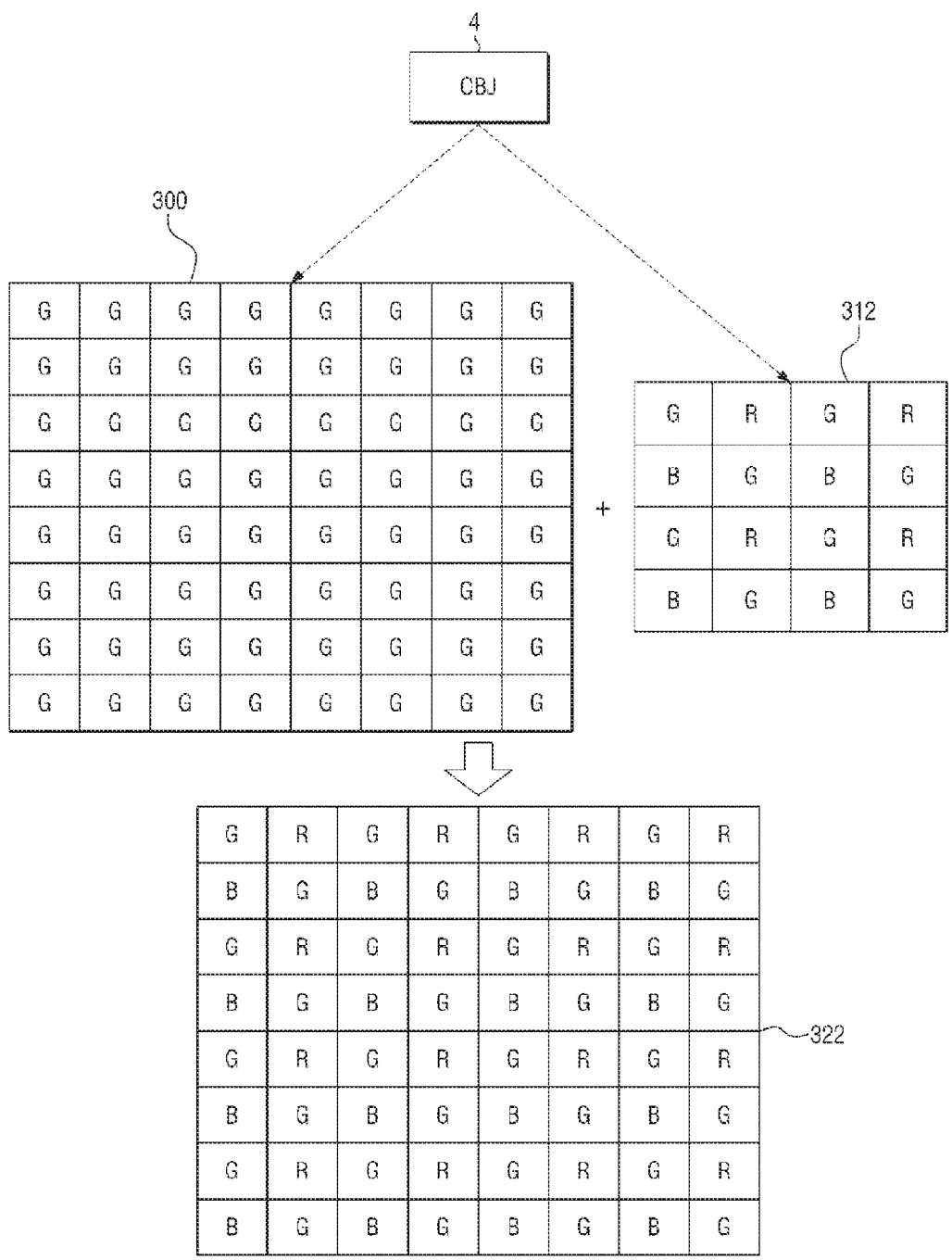
FIG. 6 schematically illustrates an operation of the image sensing device according to at least another example embodiment of the inventive concepts.
Figure 7:
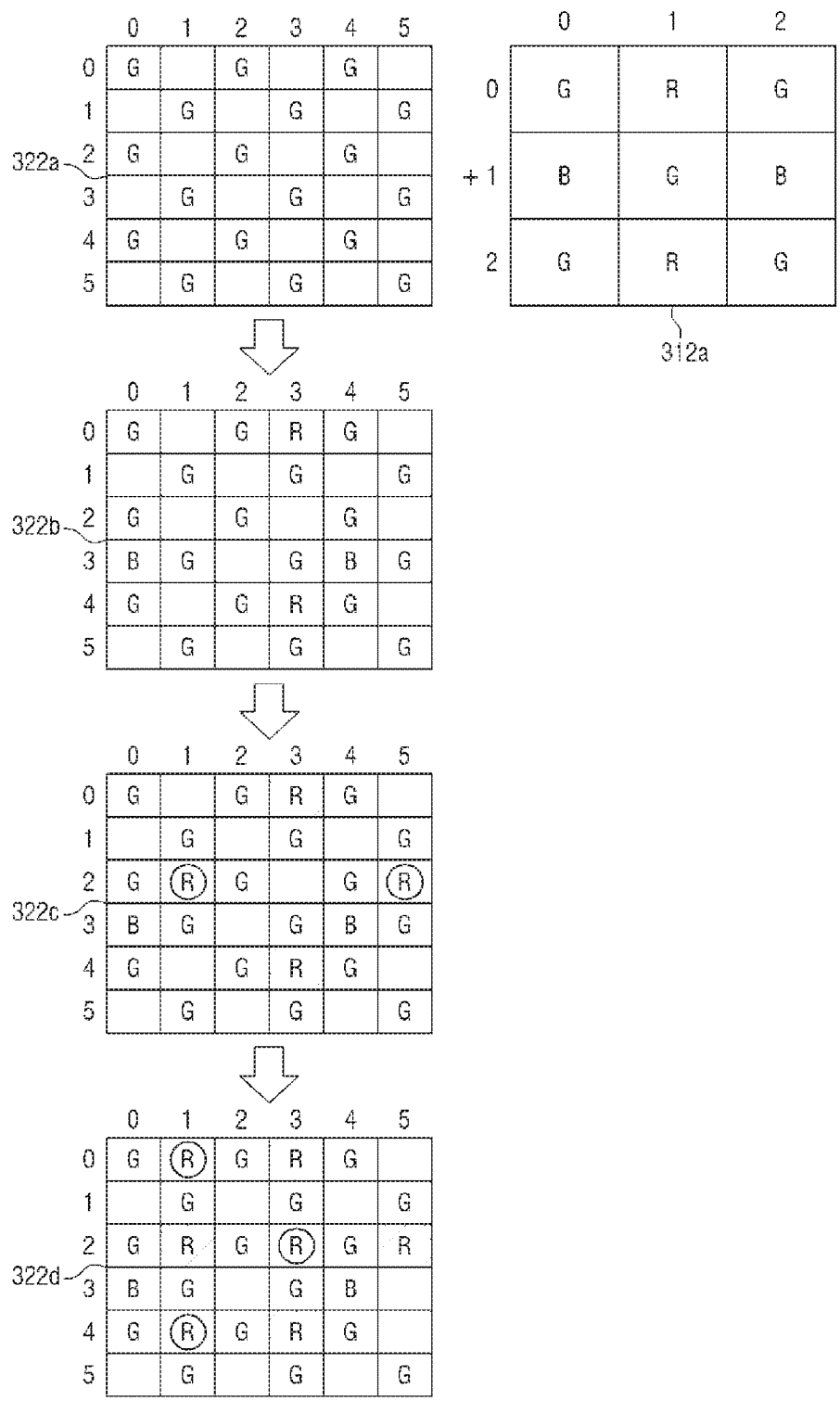
FIG. 7 and FIG. 8 schematically illustrate an example operation of the image sensing device according to at least another example embodiment of the inventive concepts.
Figure 8:
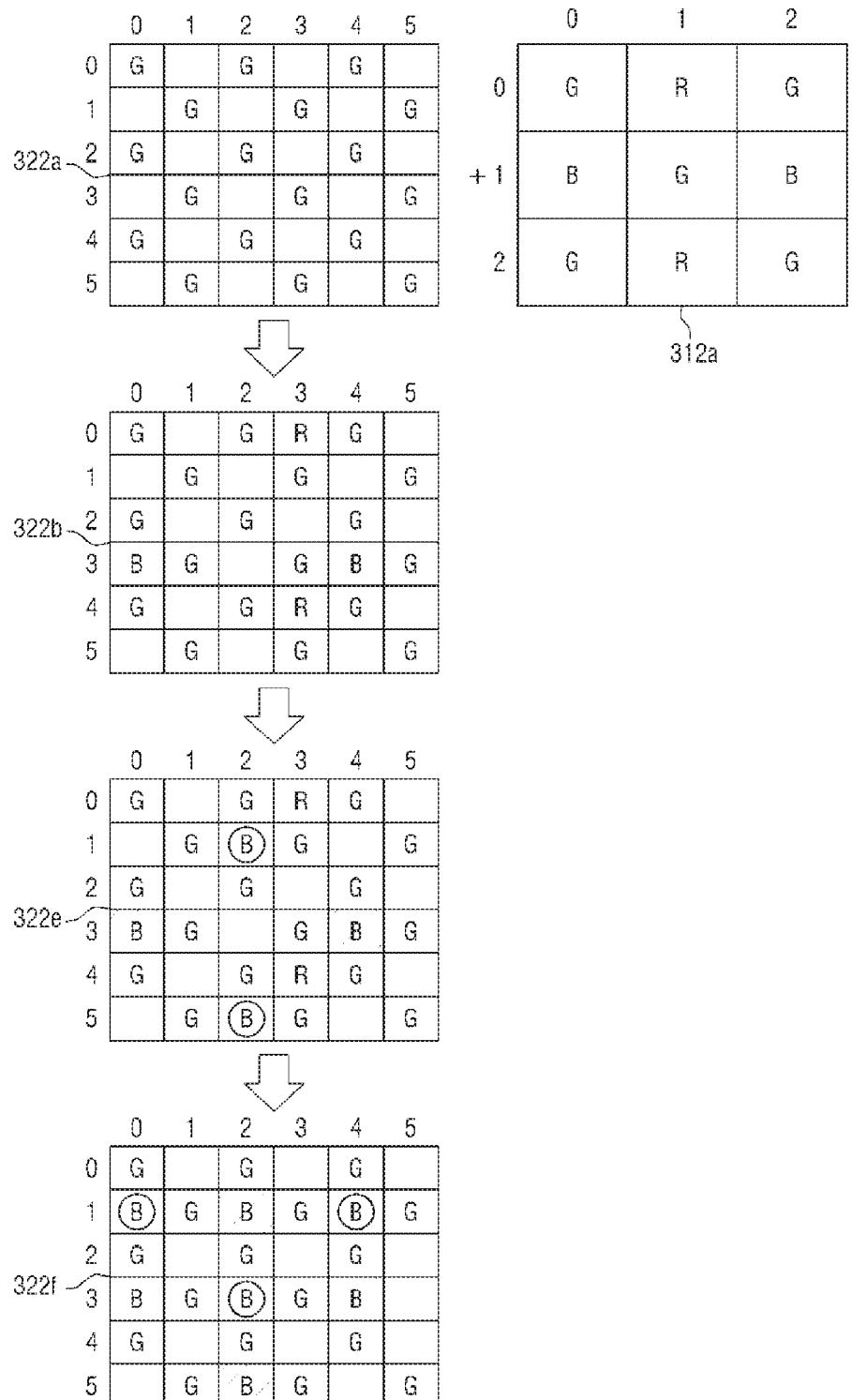

FIG. 6 schematically illustrates an operation of the image sensing device of FIG. 2 according to at least another example embodiment of the inventive concepts, and FIG. 7 and FIG. 8 schematically illustrate an example operation of the image sensing device of FIG. 2 according to at least another example embodiment of the inventive concepts.

Referring to FIG. 6, the object 4 sensed through the lens 5 or the lenses 6 and 7 may be sensed as the first image data 300 which is green image data through the first image sensor 10, and may be sensed as second image data 312 which is multi-color image data of Bayer format through the second image sensor 20. As in the aforementioned embodiment, the resolution of the first image data 300 may be four times higher than the resolution of the second image data 310, and it is assumed that the first image data 300 and the second image data 312 are spatially aligned by the first preprocessor unit 120 in the present embodiment.

Referring to FIG. 6, all pixels of the first image data 300 represent a green color, but pixels of the second image data 312 represent one of red, green and blue colors, and red pixels and blue pixels of the second image data 312 are arranged adjacent to the green pixel according to Bayer format. The second preprocessor unit 130 may merge the pixel stream of the first image data 300 and the pixel stream of the second image data 312 so as to generate third image data 322 of Bayer format.

FIG. 7 illustrates an example process in which the second preprocessor unit 130 merges the pixel stream of first image data 322a and the pixel stream of second image data 312a so as to generate third image data 322b of Bayer format. In the example shown in FIG. 7, the resolution of the third image data 322b may be determined according to the first image data 322a, and it is assumed that the resolution of the second image data 312a is lower than the resolution of the third image data 322b. For example, the resolution of the second image data 312a is half of the resolution of the third image data 322b, so that one pixel of the second image data 312a (for example, the pixel in the location (0, 0) in the second image data 312a) overlaps with four pixels of the first image data 322a (for example, the pixels in the location (0, 0), (0, 1), (1, 0), and (1, 1) in the first image data 322a). In this case, green pixels of the third image data 322b of which resolution is in accordance with the resolution of the first image data 322a may be determined directly from the corresponding pixels of the first image data 322a.

The colors of the pixels in the location (0, 3) and (4, 3) in the third image data 322b may be determined as the colors of the pixels of the second image data 312a which are overlapped with the third image data 322b. Specifically, the color of the pixel in the location (0, 3) the third image data 322b may be determined as the color R of the pixel in the location (0, 1) in the second image data 312a, and the color of the pixel in the location (4, 3) in the third image data 322b may be determined as the color R of the pixel in the location (2, 1) in the second image data 312a. Similarly, the colors of the pixels in the location (3, 0) and (3, 4) in the third image data 322b may be determined as the colors of the pixels of the second image data 312a which are overlapped with the third image data 322b. Specifically, the color of the pixel in the location (3, 0) in the third image data 322b may be determined as the color B of the pixel in the location (1, 0) in the second image data 312a, and the color of the pixel in the location (3, 4) in the third image data 322b may be determined as the color B of the pixel in the location (1, 2) in the second image data 312a.

However, since colors of the pixels in the locations (0, 1), (0, 5), (1, 0), (1, 2) and the like in the third image data 320b may not be determined only by an overlap with the second image data 312a, the colors of the pixels may be determined from the colors of the nearby pixels. For example, the colors of the pixels in the locations (2, 1) and (2, 5) in third image data 322c may be determined by performing a predetermined or, alternatively, desired operation, for example, an interpolation operation, on the values of the colors of the pixels in the locations (0, 3) and (4, 3) determined by an overlap with the second image data 312a. The colors of the pixels in the locations (0, 1), (2, 3) and (4, 1) in the third image data 322d may be determined by performing a predetermined or, alternatively, desired operation, for example, an interpolation operation, on the values of the colors of the pixels in the locations (0, 3) and (4, 3) determined by an overlap with the second image data 312a and the values of the colors of the pixels in the locations (2, 1) and (2, 5) of the third image data 322c determined in the previous step.

Referring to FIG. 8, the colors of the pixels in the locations (1, 2) and (5, 2) in third image data 322e may be determined by performing a predetermined or, alternatively, desired operation, for example, an interpolation operation, on the values of the colors of the pixels in the locations (3, 0) and (3, 4) determined by an overlap with the second image data 312a. The colors of the pixels in the locations (1, 0), (1, 4) and (3, 2) in third image data 322f may be determined by performing a predetermined or, alternatively, desired operation, for example, an interpolation operation, on the values of the colors of the pixels in the locations (3, 0) and (3, 4) determined by an overlap with the second image data 312a and the values of the colors of the pixels in the locations (1, 2) and (5, 2) of the third image data 322e determined in the previous step.

The third image data 322 generated through the above-described process may adopt Bayer format which can be processed by the ISP 150, thus ensuring compatibility between the image data acquired using the heterogeneous image sensors 10 and 20 and the ISP 150.

Figure 9:
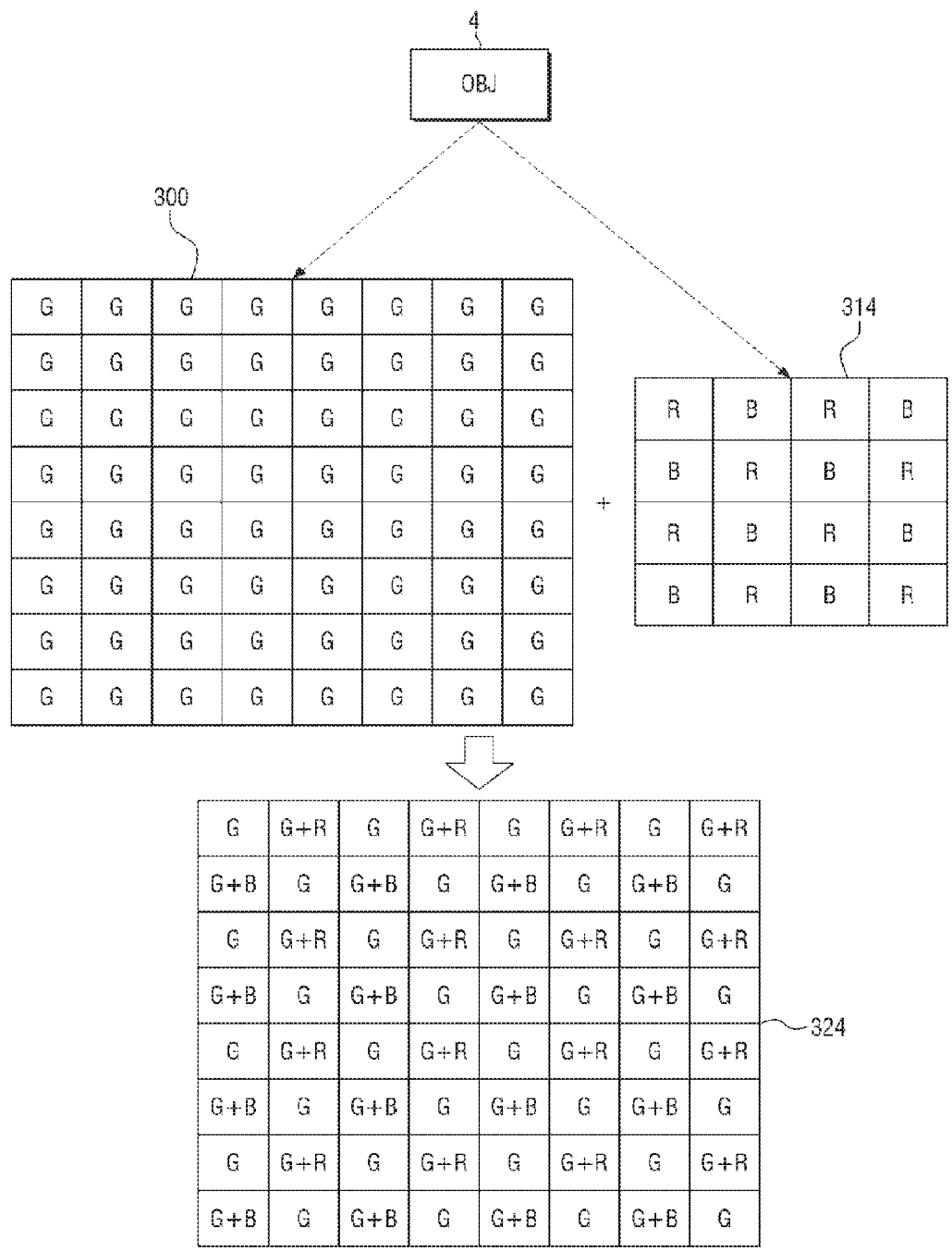
FIG. 9 schematically illustrates an operation of the image sensing device according to at least another example embodiment of the inventive concepts.

FIG. 9 schematically illustrates an operation of the image sensing device according to yet at least another example embodiment of the inventive concepts.

The operation of the image sensing device of FIG. 2 described with reference to FIG. 9 differs from the operation of the image sensing device of FIG. 2 described with reference to FIG. 4 in that third image data 324 generated from the first image data 300 and second image data 314 by the second preprocessor unit 130 adopts Bayer+ format. As discussed above with reference to FIG. 3, Bayer+ format has main features of adding a green pixel to red and blue pixels.

To generate the third image data 324 of Bayer+ format, image data of Bayer format is generated in the manner described above with reference to FIG. 5, and then a green pixel is added to red and blue pixels. However, since the third image data 324 may be in accordance with the resolution of the first image data 300, the green pixel added to red and blue pixels may be determined directly from the corresponding pixels of the first image data 300.

The third image data 324 generated through the above-described process may adopt Bayer+ format which can be processed by the ISP 150, thus ensuring compatibility between the image data acquired using the heterogeneous image sensors 10 and 20 and the ISP 150.

Figure 10:
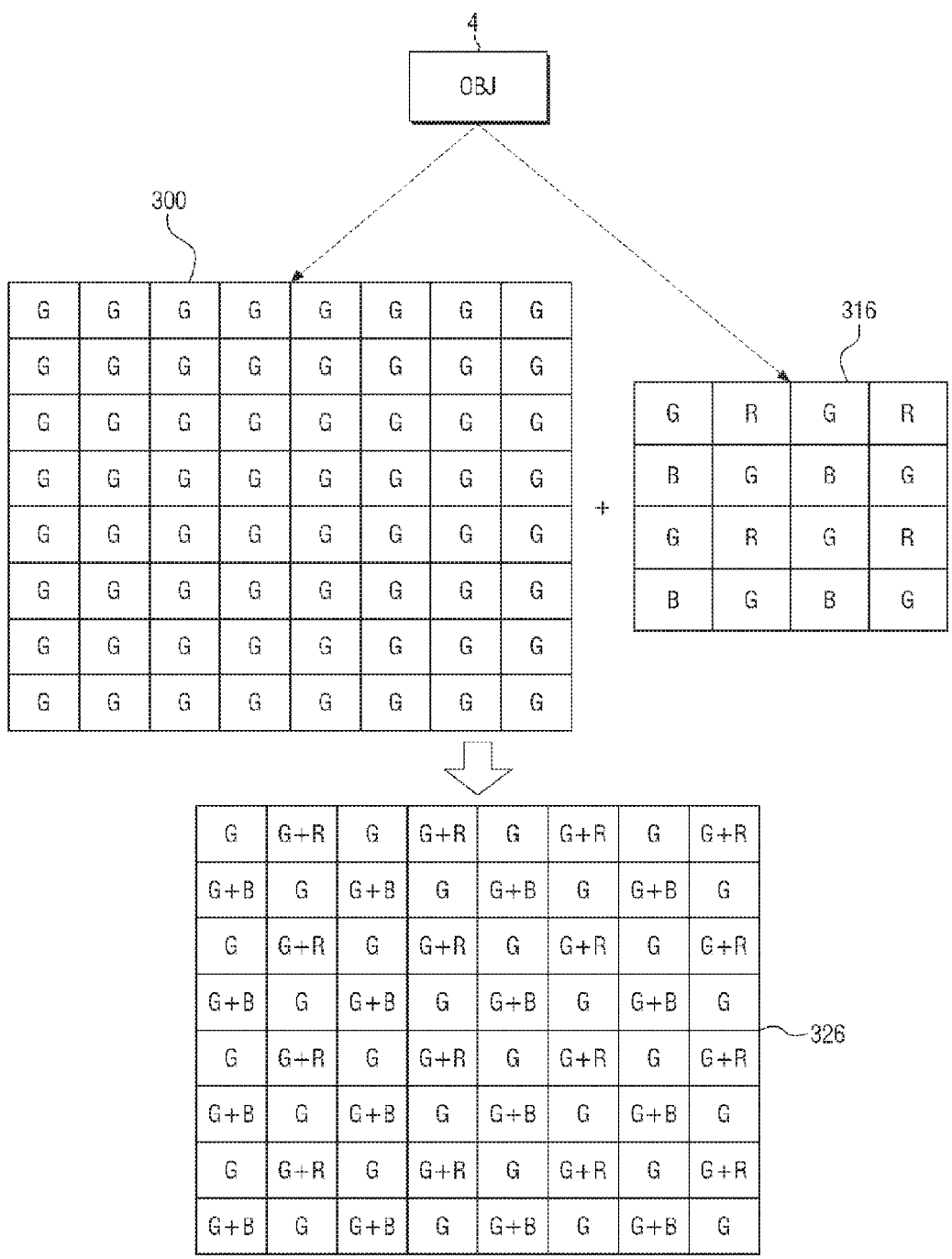
FIG. 10 schematically illustrates an operation of the image sensing device according to at least another example embodiment of the inventive concepts.

FIG. 10 schematically illustrates an operation of the image sensing device according to still at least another example embodiment of the inventive concepts.

The operation of the image sensing device of FIG. 2 described with reference to FIG. 10 differs from the operation of the image sensing device of FIG. 2 described with reference to FIG. 6 in that third image data 326 generated from the first image data 300 and second image data 316 by the second preprocessor unit 130 adopts Bayer+ format. As discussed above with reference to FIG. 3, Bayer+ format has main features of adding a green pixel to red and blue pixels.

To generate the third image data 326 of Bayer+ format, image data of Bayer format is generated in the manner described above with reference to FIG. 7 and FIG. 8, and then a green pixel is added to red and blue pixels. However, since the third image data 326 may be in accordance with the resolution of the first image data 300, the green pixel added to red and blue pixels may be determined directly from the corresponding pixels of the first image data 300.

The third image data 326 generated through the above-described process may adopt Bayer+ format which can be processed by the ISP 150, thus ensuring compatibility between the image data acquired using the heterogeneous image sensors 10 and 20 and the ISP 150.

The process for generating the third image data described thus far with reference to FIG. 4 to FIG. 10 is merely an example, and the present disclosure is not limited thereto.

Figure 11:
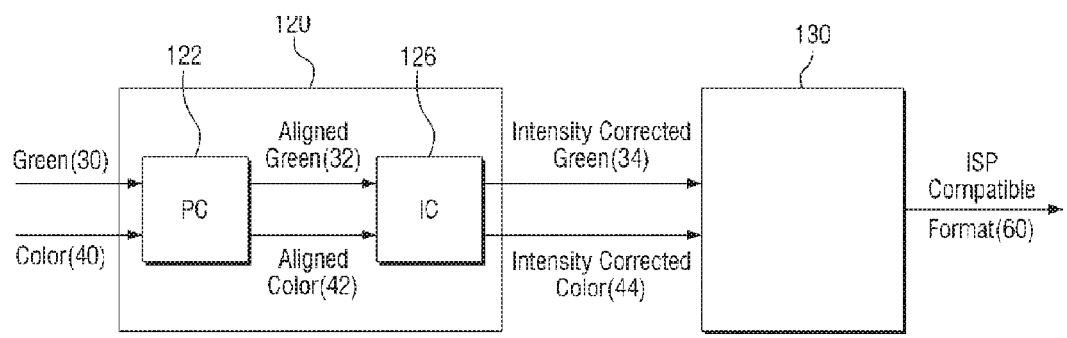
FIG. 11 schematically illustrates an image sensing device according to at least another example embodiment of the inventive concepts.

FIG. 11 schematically illustrates an image sensing device according to at least another example embodiment of the inventive concepts.

According to at least some example embodiments, the image sensing device of FIG. 11 represents an example implementation of a portion of the image sensing device of FIG. 2. Referring to FIG. 11, the first preprocessor unit 120 of the image sensing device according to at least another example embodiment of the inventive concepts may include an optical path correction unit 122 and an intensity difference correction unit 126. As is noted above with respect to FIG. 1A, the first preprocessor unit 120 (and/or elements thereof, including the optical path correction unit 122 and an intensity difference correction unit 126) may be embodied by electronic circuits, software executed by a processor, or a combination of the above-referenced electronic circuits and software executed by the processor.

The optical path difference correction unit 122 may receive the green image data 30 acquired by the first image sensor 10 and the multi-color image data 40 acquired by the second image sensor 20, and the first preprocessor unit 120 may spatially align the green image data 30 and the multi-color image data 40 so as to enable the second preprocessor unit 130 to perform later a merge operation of the image data.

The intensity difference correction unit 126 may receive, from the optical path difference correction unit 122, the optical path difference corrected green image data 32 and the optical path difference corrected multi-color image data 42, and perform an intensity difference correction on the received data. For example, the intensity difference correction unit 126 may calculate an average ($Avg(I_G)$) of the intensity values of the pixels of the optical path difference corrected green image data 32 and an average ($Avg(Ic)$) of the intensity values of the pixels of the optical path difference corrected age data 42. The intensity difference correction unit 126 may then adjust the intensity values of the pixels such that a difference value ($\Delta f_1$) between the average ($Avg(I_G)$) and average ($Avg(Ic)$) may not exceed a predetermined or, alternatively, desired range.

As another example, when the second image sensor 20 which has output the multi-color image data 40 adopts Bayer format including a green pixel, the intensity difference correction unit 126 may calculate an average ($Avg(I_G)$) of the intensity values of the pixels of the optical path difference corrected green image data 32 and an average ($Avg(I_{GfromC})$) of the intensity values of the green pixels among the pixels of the optical path difference corrected multi-color image data 42. The intensity difference correction unit 126 may then adjust the intensity values of the pixels such that a difference value ($\Delta f_2$) between the average ($Avg(I_G)$) and average ($Avg(I_{GfromC})$) may not exceed a predetermined or, alternatively, desired range.

The second preprocessor unit 130 may receive, from the first preprocessor unit 120, the intensity difference corrected green image data 34 and the intensity difference corrected multi-color image data 44, and convert the received data into image data of the single ISP compatible format 60.

Figure 12:
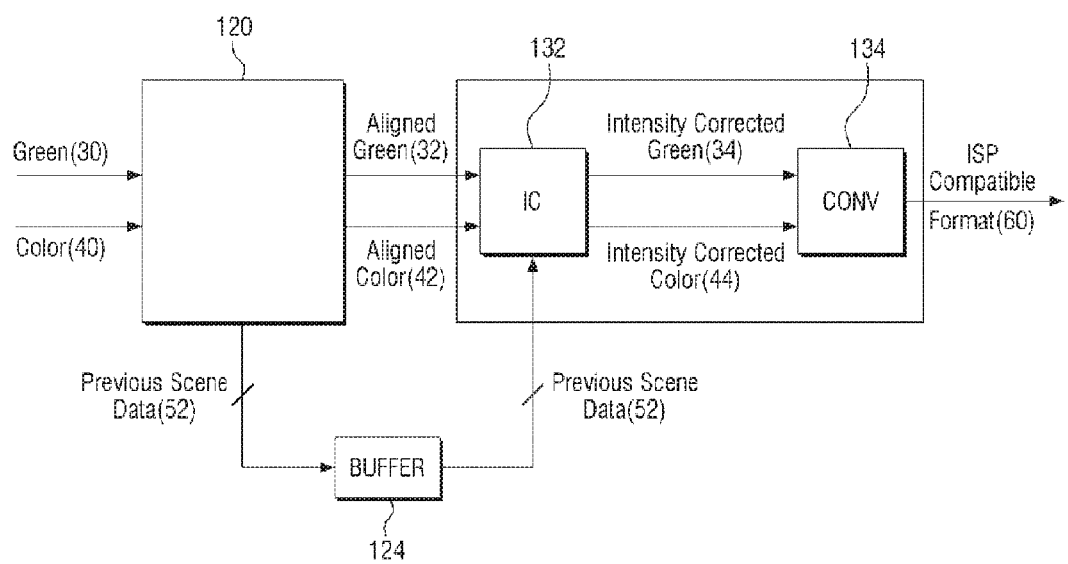
FIG. 12 schematically illustrates an image sensing device according to at least another example embodiment of the inventive concepts.

FIG. 12 schematically illustrates an image sensing device according to yet at least another example embodiment of the inventive concepts.

According to at least some example embodiments, the image sensing device of FIG. 12 represents an example implementation of a portion of the image sensing device of FIG. 2. The embodiment to be described with reference to FIG. 12 differs from the embodiment described with reference to FIG. 11 in that the intensity difference correction is performed by the second preprocessor unit 130 rather than the first preprocessor unit 120. In the present embodiment, the second preprocessor unit 130 may include an intensity difference correction unit 132 and an image data converting unit 134. As is noted above with respect to FIG. 1A, the second preprocessor unit 130 (and/or elements thereof, including the intensity difference correction unit 132 and an image data converting unit 134) may be embodied by electronic circuits, software executed by a processor, or a combination of the above-referenced electronic circuits and software executed by the processor.

The first preprocessor unit 120 may receive the green image data 30 acquired by the first image sensor 10 and the multi-color image data 40 acquired by the second image sensor 20, and spatially align the green image data 30 and the multi-color image data 40 so as to enable the second preprocessor unit 130 to perform later a merge operation of the image data. Furthermore, the first preprocessor unit 120 may provide the spatially aligned green image data 32 and multi-color image data 42 to the second preprocessor unit 130, and store, as previous scene data 52, the spatially aligned green image data 32 and multi-color image data 42 in the buffer 124.

The intensity difference correction unit 132 of the second preprocessor unit 130 may receive, from the first preprocessor unit 120, the spatially aligned green image data 32 and multi-color image data 42 corresponding to the current scene data, and receive the previous scene data 50 from the buffer 124. For example, the intensity difference correction unit 132 may read the buffer 124.

The second preprocessor unit 130 may calculate intensity difference information from the pixel streams contained in the previous scene data 50 provided from the buffer 124 in the same manner as those described with reference to FIG. 11. The second preprocessor unit 130 may then apply the intensity difference information calculated from the previous scene data 50 to the current scene data provided from the first preprocessor unit 120 so as to perform an intensity difference correction.

The intensity difference correction unit 132 may receive, from the optical path difference correction unit 122, the optical path difference corrected green image data 32 and the optical path difference corrected multi-color image data 42, and perform an intensity difference correction on the received data. For example, the intensity difference correction unit 132 may calculate an average ($Avg(I_G)$) of the intensity values of the pixels of the green image data of the previous scene data 50 and an average ($Avg(I_C)$) of the intensity values of the pixels of the multi-color image data of the previous scene data 50. The intensity difference correction unit 132 may then adjust the intensity values of the pixels of the current scene data such that a difference value ($\Delta f_1$) between the average ($Avg(I_G)$) and average ($Avg(Ic)$) may not exceed a predetermined or, alternatively, desired range.

As another example, when the second image sensor 20 which has output the multi-color image data 40 adopts Bayer format including a green pixel, the intensity difference correction unit 132 may calculate an average ($Avg(I_G)$) of the intensity values of the pixels of the green image data of the previous scene data 50 and an average ($Avg(I_{GfromC})$) of the intensity values of the green pixels among the pixels of the multi-color image data. The intensity difference correction unit 132 may then adjust the intensity values of the pixels of the current scene data such that a difference value ($\Delta f_2$) between the average ($Avg(I_G)$) and average ($Avg(I_{GfromC})$) may not exceed a predetermined or, alternatively, desired range.

The image data converting unit 134 may then receive, from the intensity difference correction unit 132, the intensity difference corrected green image data 34 and the intensity difference corrected multi-color image data 44, and convert the received data into image data of the single ISP compatible format 60.

The specific process for the intensity difference correction described thus far with reference to FIG. 11 and FIG. 12 is merely an example, and the present disclosure is not limited thereto.

Figure 13:
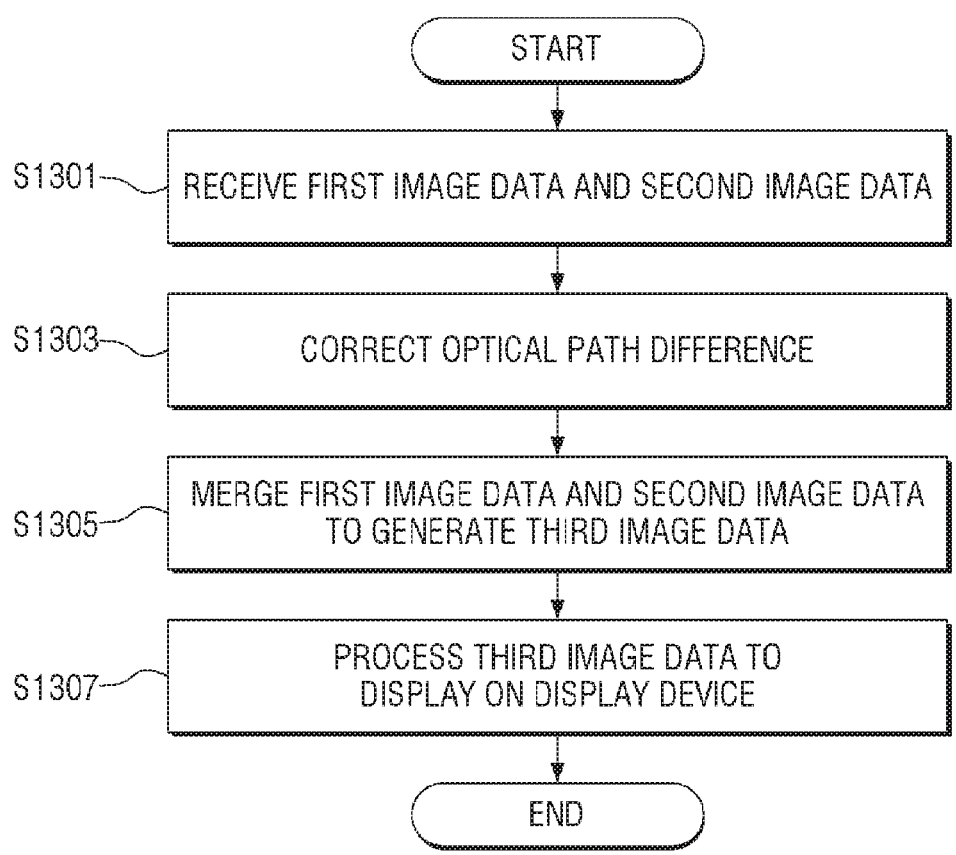
FIG. 13 is a flowchart illustrating an image sensing method according to at least one example embodiment of the inventive concepts.

FIG. 13 is a flowchart illustrating an image sensing method according to at least one example embodiment of the inventive concepts.

Referring to FIG. 13, an image sensing method according to at least one example embodiment of the inventive concepts may include receiving first image data and second image data respectively from the first image sensor 10 and the second image sensor 20 (S1301), wherein the first image sensor 10 may be a single-color image sensor and the second image sensor 20 may be a multi-color image sensor.

Furthermore, the method may include correcting an optical path difference between the pixel stream of the first image data and the pixel stream of the second image data (S1303), and merging the optical path difference corrected pixel stream of the first image data and the optical path difference corrected pixel stream of the second image data so as to generate third image data (S1305). According to at least some example embodiments, the third image data may have a format which can be processed by an image signal processor, for example, Bayer format or Bayer+ format.

The method may further include processing the third image data so as to display an image on a display device (S1307).

Figure 14:
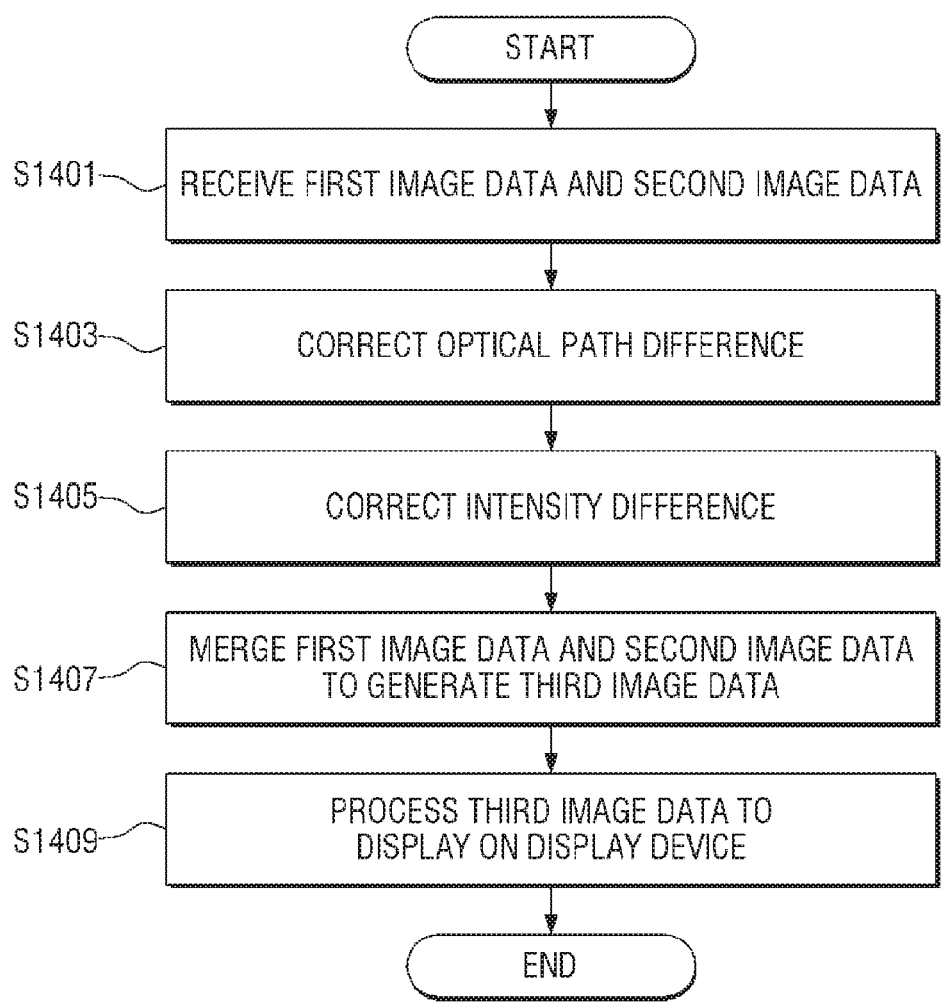
FIG. 14 is a flowchart illustrating an image sensing method according to at least another example embodiment of the inventive concepts.

FIG. 14 is a flowchart illustrating an image sensing method according to at least another example embodiment of the inventive concepts.

Referring to FIG. 14, an image sensing method according to at least another example embodiment of the inventive concepts may include receiving first image data and second image data respectively from the first image sensor 10 and the second image sensor 20 (S1401), wherein the first image sensor 10 may be a single-color image sensor and the second image sensor 20 may be a multi-color image sensor.

Furthermore, the method may include correcting an optical path difference between the pixel stream of the first image data and the pixel stream of the second image data (S1403), correcting an intensity difference between the pixel stream of the first image data and the pixel stream of the second image data that have undergone the optical path difference correction (S1405), and merging the pixel stream of the first image data and the pixel stream of the second image data that have undergone the optical path difference correction and the intensity difference correction so as to generate third image data (S1407). In this case, the third image data may have a format which can be processed by an image signal processor, for example, Bayer format or Bayer+ format.

The method may further include processing the third image data so as to display an image on a display device (S1409).

Figure 15:
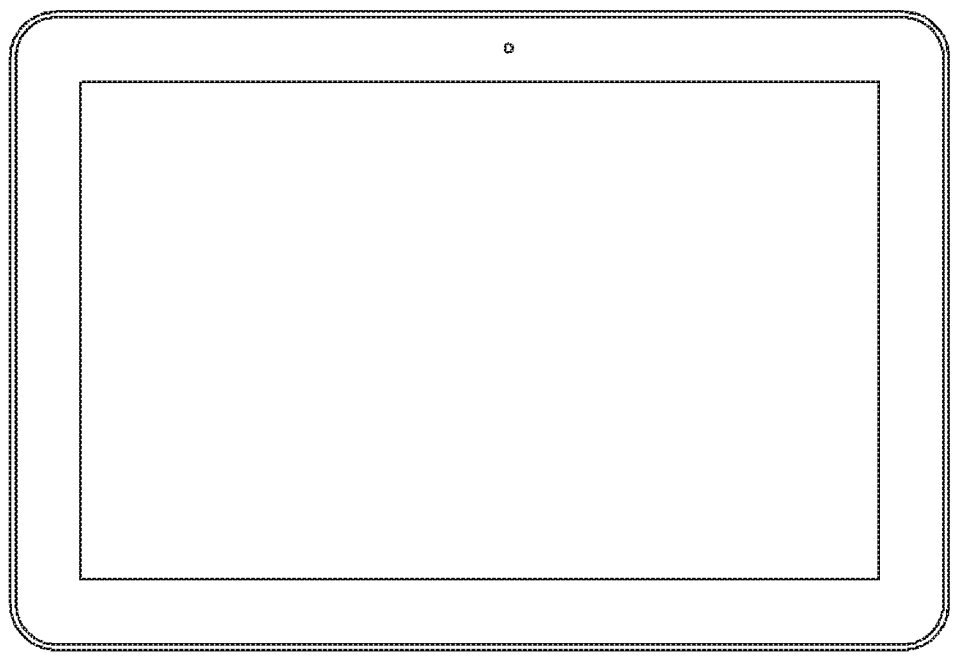
FIGS. 15 to 17 are diagrams illustrating examples of semiconductor systems to which at least one of image sensing devices and image processing systems according to at least some example embodiments of the inventive concepts can be applied.
Figure 16:
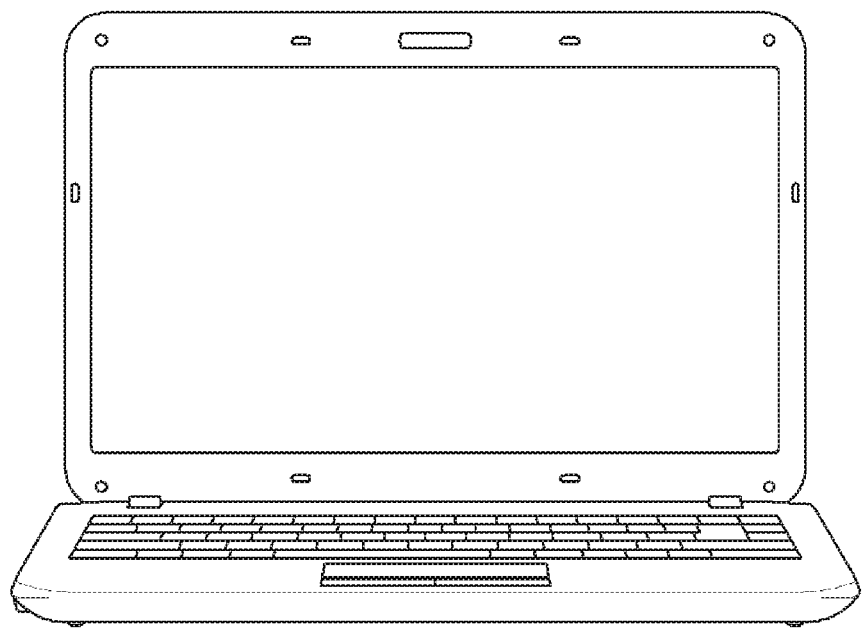
Figure 17:
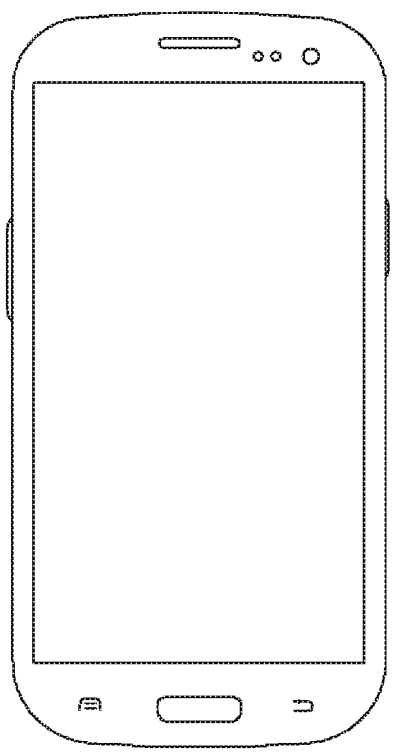

FIG. 15 to FIG. 17 are diagrams illustrating examples of electronic (e.g., semiconductor-based systems) to which at least one of image sensing devices and image processing systems according to at least some example embodiments of inventive concepts can be applied.

FIG. 15 illustrates a tablet PC 1200, FIG. 16 illustrates a notebook 1300, and FIG. 17 illustrates a smart phone 1400. At least one of image sensing devices and image processing systems discussed above with reference to FIGS. 1A-14 may be used in the tablet PC 1200, the notebook 1300, the smart phone 1400 and the like.

Furthermore, while FIGS. 15-17 provide only the tablet PC 1200, the notebook 1300 and the smart phone 1400 as examples of systems that may include one or more example embodiments of the inventive concepts as described above with reference to FIGS. 1A-13, at least some example embodiments of the inventive concepts are not limited to the examples of FIGS. 15-17. For example, at least one of the image sensing devices and image processing systems according to at least some example embodiments of the inventive concepts may also be applied to other integrated circuit devices which are not illustrated herein. A semiconductor system including at least one of the image sensing devices and image processing systems according to at least some example embodiments of the inventive concepts may be embodied in a computer, an ultra mobile PC (UMPC), a workstation, a net-book, a personal digital assistant (PDA), a portable computer, a wireless phone, a mobile phone, an e-book, a portable multimedia player (PMP), a portable gaming console, a navigation device, a black box, a digital camera, a 3-dimensional television, a digital picture player, a digital video recorder and the like.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An image sensing device comprising:
   a single-color image sensor and a multi-color image sensor having resolutions different from each other;
   image data receiving circuitry configured to receive first image data from the single-color image sensor and second image data from the multi-color image sensor;
   first preprocessor circuitry configured to,
      generate first aligned image data and second aligned image data based on the first image data and the second image data, respectively, by correcting an optical path difference between a pixel stream of the first image data and a pixel stream of the second image data; and
   second preprocessor circuitry configured to generate third image data by merging the first aligned image data and the second aligned image data,
   wherein the first preprocessor circuitry is further configured to generate a pixel stream of the first aligned image data and a pixel stream of the second aligned image data by correcting the optical path difference between the pixel stream of the first image data and the pixel stream of the second image data, and the second preprocessor circuitry is further configured to correct an intensity difference between the first aligned image data and the second aligned image data prior to merging the first aligned image data and the second aligned image data, and
   wherein the second preprocessor circuit is configured to calculate intensity difference information from the first aligned image data and the second aligned image data with respect to a previous scene, and correct the intensity difference between the first aligned image data and the second aligned image data with respect to a current scene by using the intensity difference information.

2. The image sensing device of claim 1, wherein the single-color image sensor is configured to sense green light.

3. The image sensing device of claim 1, wherein the multi-color image sensor is configured to sense red light and blue light.

4. The image sensing device of claim 1, wherein the multi-color image sensor is configured to,
   sense red light, green light and blue light, and
   output the second image data in Bayer format.

5. The image sensing device of claim 1, wherein the second preprocessor circuitry is configured to generate the third image data in Bayer format or Bayer+ format.

6. The image sensing device of claim 1, wherein the single-color image sensor and the multi-color image sensor are located in the image sensing device such that the single-color image sensor and the multi-color image sensor are located on a same plane.

7. The image sensing device of claim 1, further comprising:
   a first lens and a second lens,
   wherein the single-color image sensor is configured to sense light through the first lens and the multi-color image sensor is configured to sense light through the second lens.

8. The image sensing device of claim 1, wherein the first preprocessor circuitry is configured to align the pixel stream of the first image data and the pixel stream of the second image data in a virtual single plane so as to correct the optical path difference between the pixel streams of the first and second image data.

9. The image sensing device of claim 1, wherein the second preprocessor circuitry is configured to generate the third image data based on a resolution of the first image data.

10. An image processing system comprising:
    a single-color image sensor and a multi-color image sensor having resolutions different from each other, the single-color image sensor and the multi-color image sensor being configured to generate a first pixel stream and a second pixel stream, respectively;
    preprocessing circuitry configured to,
       generate a first aligned pixel stream and a second aligned pixel stream based on a first pixel stream and a second pixel stream, respectively, by correcting an optical path difference between the first pixel stream and the second pixel stream, and
       generate a third pixel stream by merging the first aligned pixel stream and the second aligned pixel stream; and
    an image signal processor (ISP) configured to receive the third pixel stream, generate an image from the third pixel stream, and display the generated image on a display,
    wherein the preprocessing circuitry includes a first preprocessor circuit configured to generate the first aligned pixel stream and the second aligned pixel stream by correcting the optical path difference between the first pixel stream and the second pixel stream, and the preprocessing circuitry includes a second preprocessor circuit configured to correct an intensity difference between the first aligned pixel stream and the second aligned pixel stream prior to merging the first aligned pixel stream and the second aligned pixel stream, and wherein the second preprocessor circuit is configured to calculate intensity difference information from the first aligned pixel stream and the second aligned pixel stream with respect to a previous scene, and correct the intensity difference between the first aligned pixel stream and the second aligned pixel stream with respect to a current scene by using the intensity difference information.

11. The image processing system of claim 10, wherein the first preprocessor circuit is configured to store the first aligned pixel stream and the second aligned pixel stream for the previous scene in a buffer, and the second preprocessor circuit is configured to read the buffer so as to acquire the first aligned pixel stream and the second aligned pixel stream for the previous scene.

12. An image sensing device comprising:
a single-color image sensor and a multi-color image sensor having resolutions different from each other;
a memory storing computer-executable instructions; and
one or more processors configured to execute the computer-executable instructions such that the one or more processors are configured to,
generate first aligned image data and second aligned image data based on first image data and second image data, respectively, by correcting an optical path difference between a pixel stream of the first image data and a pixel stream of the second image data, and
generate third image data by merging the first aligned image data and the second aligned image data, the first image data being image data generated based on light incident on the single-color image sensor, the second image data being image data generated based on light incident on the multi-color image sensor,
wherein the one or more processors are configured to execute the computer-executable instructions such that the one or more processors are further configured to,
generate the first aligned image data and the second aligned image data by correcting the optical path difference between the pixel stream of the first image data and the pixel stream of the second image data,
calculate intensity difference information from the first aligned image data and the second aligned image data with respect to a previous scene, and
prior to merging the first aligned image data and the second aligned image data, correct an intensity difference between the first aligned image data and the second aligned image data with respect to a current scene by using the intensity difference information.

13. The image sensing device of claim 12, wherein the single-color image sensor is configured to sense green light.

14. The image sensing device of claim 12, wherein the multi-color image sensor is configured to sense red light and blue light.

15. The image sensing device of claim 12, further comprising:
a first lens and a second lens,
wherein the single-color image sensor is configured to sense light through the first lens and the multi-color image sensor is configured to sense light through the second lens.

16. The image sensing device of claim 12, further comprising:
a first lens,
wherein the single-color image sensor is configured to sense light through the first lens and the multi-color image sensor is configured to sense light through the first lens.

* * * * *